ized Patents.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ELECTRODE.

948,558.  Specification of Letters Patent.  Patented Feb. 8, 1910.

No Drawing. Original application filed March 30, 1905, Serial No. 252,931. Divided and this application filed December 3, 1906. Serial No. 345,986.

*To all whom it may concern:*

Be it known that I, THOMAS A. EDISON, a citizen of the United States, and a resident of Llewellyn Park, Orange, in the county of Essex and State of New Jersey, have invented certain new and useful Improvements in Storage-Battery Electrodes, of which the following is a description.

This application is a division of patent No. 839,371, granted Dec. 25, 1906.

My invention relates to storage batteries and more particularly to the production of an improved positive electrode for use in connection with batteries of the type invented by me wherein electrolytically active nickel hydroxid or other active salt, is surrounded by or coated with flake-like conducting material, for example, flake graphite, flake nickel, cobalt or alloy of nickel and cobalt, etc.

The active mass herein described and claimed may be produced by the process which forms the subject matter of the patent of which this is a division, which process can be carried out effectively with flake-like conducting material even when the latter is of a very friable nature, as is the case with electro-deposited nickel or cobalt films, and since practically no pressure is utilized in the mixing operation, there can be no objectionable grinding of the nickel or cobalt if used. Furthermore the resulting cake or mass of active material is of such a character that good contact throughout its entire mass is secured, and all the particles will have an equal opportunity of being acted upon by the current. The active mass will present innumerable paths through which the current may traverse, permitting all the particles of active material to be reached and acted upon by the current.

In carrying my invention into effect, I proceed substantially as follows:—A suitable nickel compound, such as the hydroxid thereof, obtained in any suitable way, is first ground so as to present particles of substantially a definite size, ranging say between those which pass a 20 mesh screen and are arrested by a 60 mesh screen. To the active mass I then mix a sufficient quantity of a suitable sticky material until the surfaces of the active particles are covered with a thin layer of the sticky material. The preferred sticky material used is molasses, which is cheap and can be readily removed by washing, but obviously any other suitable material for the purpose may be employed. The mixing of the sticky material with the active mass is preferably effected in a suitable mixer, wherein little or no pressure is applied such for example as that described in my Patent No. 605,668 of June 14, 1898. After the sticky material has been intimately mixed with the active mass, and while preferably in the mixer, I add the flake-like conducting material, such as flake graphite or flake-like metallic nickel or cobalt or nickel cobalt alloy and continue the mixing until practically the whole exposed surfaces of all the active particles are covered with the conducting films or flakes. Under the microscope it has been observed that frequently a single particle may be covered with a number of small flakes adhering to the facets of the particles, and in some instances the flakes or foils are actually bent around the particles so as to wholly or partially envelop the same, without, however, preventing the free escape of gas. Whatever the particular disposition of the flakes or scales upon, or with respect to, the active particles may be, the fact is, that by the process described the active particles are practically covered as to their entire surfaces, by flakes or scales of the conducting material. Suitable proportions which may be employed are eight parts by weight, of nickel hydroxid, and two parts by weight, of the flake-like conducting material. With these proportions the continued mixing as described results in the complete covering of the active particles, as explained, so that the entire mass uniformly presents the appearance of being composed wholly of the flake-like conducting substance. After the mixing operation the mass is dried and is then applied in the usual way to the pockets of the battery grid and subjected to a moderate pressure, generally about one-third of that ordinarily employed, or about two thousand pounds per pocket. This pressure is sufficient to hold the powdered mass in position and in this condition the electrode plates are immersed in water, slightly alkaline, to prevent rust, and the molasses thoroughly dissolved out. A thorough dissolution of the sticky material generally requires several changes of water and takes place in about forty-eight hours. The plate is now thoroughly dried, and the final pressure (about six thousand pounds per pocket) is applied to lock the pocket sections in place, after which the electrode is ready to be assembled in the battery.

Having now described my invention, what I claim as new and desire to secure by Letters Patent is as follows:

1. An active mass for storage battery electrodes, comprising a compressed agglomeration of active particles individually surrounded by flake-like conducting material, as and for the purposes set forth.

2. An active mass for storage battery electrodes, comprising a compressed agglomeration of relatively large active particles individually surrounded by flake-like conducting material, substantially as set forth.

3. An active mass for storage battery electrodes, comprising a compressed agglomeration of active particles of nickel hydroxid individually surrounded by flake-like conducting material, substantially as set forth.

4. An active mass for storage battery electrodes, comprising a compressed agglomeration of active particles individually surrounded by flake-like conducting material composed of nickel, substantially as set forth.

5. An active mass for storage battery electrodes, comprising a compressed agglomeration of active particles of nickel hydroxid individually surrounded by flake-like conducting material composed of nickel, substantially as set forth.

6. An active mass for storage battery electrodes, comprising a compressed agglomeration of active particles individually surrounded by flake-like conducting material composed of an alloy of nickel and cobalt, substantially as set forth.

This specification signed and witnessed this 28th day of November, 1906.

THOMAS A. EDISON.

Witnesses:
    FRANK L. DYER,
    FRANK D. LEWIS.